M. CZINER.
Vaporizing Apparatus.
No. 218,862. Patented Aug. 26, 1879.
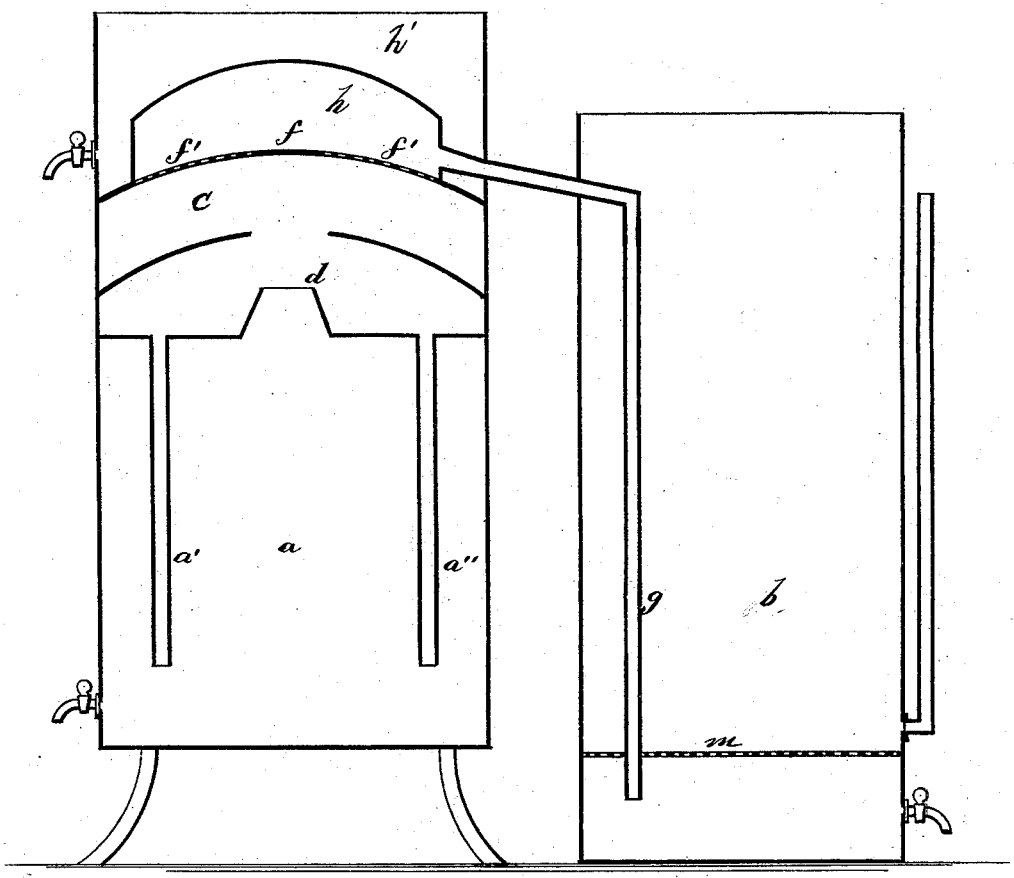
WITNESSES
INVENTOR
ATTORNEY.

UNITED STATES PATENT OFFICE.

MAX CZINER, OF MIDDLETOWN, NEW YORK, ASSIGNOR OF ONE-HALF HIS RIGHT TO WINSLOW ROBINSON, OF SAME PLACE.

IMPROVEMENT IN VAPORIZING APPARATUS.

Specification forming part of Letters Patent No. 218,862, dated August 26, 1879; application filed May 29, 1879.

*To all whom it may concern:*

Be it known that I, MAX CZINER, of Middletown, Richmond county, New York, have invented certain new and useful Improvements in Apparatus for Vaporizing Liquids, of which the following is a specification.

The following is a description of my newly-invented vaporizing apparatus, reference being had to the drawing hereto annexed.

The invention relates to that class of vaporizing apparatus in which alcoholic vapors are driven from any mash or suitable substance, but which does not contain any worm, gooseneck, or similar contrivances.

The object of my invention is to extract perfectly pure alcoholic vapors from a mash, which, by their solution in water, will produce a transparent pure fluid.

In the drawing, $a$ is the evaporating-chamber, where the mash is received. During the process of evaporation the vapors escape through the conical mouth-piece $d$, and the heavier vapors, containing the most impurities, will collect in the chamber $c$, and from there return to the mash through the pipes $a'$ $a''$. Here they will undergo a repeated treatment by heat. The purer lighter vapors will rise and strike against the solid center part of the disk $f$. This will separate the lighter impurities from the pure alcoholic vapors and return them to the chamber $a$. The purified vapors will then rise through the perforated part $f'$ of the disk $f$ to the chamber $h$. The chamber $h$ is surrounded by water except on its lower surface. This is done to retard the vapors, but not to condense the vapors. Such as may be condensed will return through the disk to the evaporating-chamber $a$. The pure vapors now pass through the pipe $g$ into the lower part of the collecting-vessel $b$, which is filled with water. To compel the vapors to spread in the water and cause a better distribution, a perforated disk, $m$, is mounted in the collecting-vessel $b$, through which the vapors rise and become thoroughly mixed with and absorbed by the water.

I claim—

1. In combination with the vapor-chamber $h$ and the chamber $h'$, the partially-perforated partition, forming a suitable bottom to each chamber, substantially as and for the purpose described.

2. The partition forming the top of the evaporating-chamber, provided with the conical opening $d$, and with the depending return-pipes $a'$ $a''$, in combination with the perforated partition $f'$, having the imperforate part $f$, located immediately above the conical opening, and having a hood secured to its upper side, forming the vapor-chamber $h$, substantially as set forth.

3. In combination with the still-chamber, the vapor-chamber and the open chamber, both resting on the partially-perforated partition, the pipe $g$ and the vapor-collector, substantially as described.

MAX CZINER.

Witnesses:
 CHAS. RAETTIG,
 A. C. AUBERY.